UNITED STATES PATENT OFFICE.

AUGUSTE VASSEUX, OF HAL, BELGIUM.

PROCESS OF MAKING FERTILIZERS.

No. 835,692.

Specification of Letters Patent.

Patented Nov. 13, 1906.

Application filed July 6, 1903. Serial No. 164,625.

*To all whom it may concern:*

Be it known that I, AUGUSTE VASSEUX, a subject of the King of the Belgians, residing at Hal, Belgium, have invented a Process of Treating Low Wines from Distilleries, of which the following is a specification.

The by-products derived from the treatment of sugar-beets, grain, and similar vegetable substances in the process of refining and distilling contain certain mineral salts and also a large quantity of organic nitrogen, which latter substance, highly valuable as a fertilizer, has heretofore been lost during the process employed for the recovery of the salts.

My invention may be said to consist in a process by reason of which such mineral salts are separated and both of these substances made available as fertilizers.

To carry my process into effect, I proceed as follows: The fluid by-products, however derived, are first concentrated in an evaporator. Such concentrate will be found to have approximately the following composition in one hundred parts: water, 22.20; ashes, 27.00; organic material, 50.80; and the twenty-seven parts of ashes in one hundred parts; potassium carbonate, ($K_2CO_3$,) 39.19; sodium carbonate, ($Na_2CO_3$,) 14.02; potassium chlorid, (KCl,) 8.46; potassium sulfate, ($K_2SO_4$,) 20.57; insoluble material, 13.98; water, 3.00; undetermined, .78. To one hundred grams of the concentrate having the properties stated there is then added eleven grams of sulfuric acid, which sulfuric acid converts the potassium and sodium carbonates of the ash into potassium sulfate and sodium sulfate.

In the practical operation of my process I obtain from one thousand kilos of by-products, (treacle,) 348.60 kilos of concentrate of the composition stated. This contains 94.12 kilos of ashes, containing 36.88 kilos of potassium carbonate, requiring 26.18 kilos of sulfuric acid to form potassium sulfate, 13.19 kilos of sodium carbonate requiring 12.19 kilos of sulfuric acid to form sodium sulfate, ($Na_2SO_4$.) After the addition of the sulfuric acid the solution is allowed to stand for a sufficient time to permit crystallization of the potassium sulfate, after which the solution is introduced into a centrifugal machine and spun to separate the crystallized potassium sulfate from the solution. From one hundred thousand kilos of treacle there are obtained, approximately, seventy-seven kilos of potassium sulfate containing eighty per cent. of pure potassium sulfate. This residual body forms a fertilizer high in organic nitrogen which may be readily sold. In place of evaporating and drying, the residual body may be discharged into any suitable carrying medium—such, for instance, as peat, sawdust, infusorial earth, or other similar body—preferably an absorbing body.

Having thus described my invention, I claim—

1. The process of preparing a fertilizer containing "amids," which consists in subjecting by-products such as described, to the action of a chemical agent which will convert the metallic salts into a crystallizable body without destroying the organic nitrogen present, then separating such crystallizable body from the solution.

2. The process of converting by-products such as described, into a fertilizer containing organic nitrogen, which consists in separating from such by-products, through the action of sulfuric acid and crystallization, the major portion of the metallic salts contained in such by-products.

3. The process of separating the metallic salts and organic nitrogen in by-products such as described, which consists in first concentrating the by-products, then subjecting them to the action of sulfuric acid, then crystallizing the potassium sulfate, then separating the major portion of the potassium-sulfate crystals from the liquid portion of the solution containing the organic nitrogen.

4. A step in the process of separating the metallic salts and organic nitrogen contained in by-products such as described, which consists in introducing into such by-products sufficient sulfuric acid to convert the contained metallic salts into potassium sulfate.

AUGUSTE VASSEUX.

In presence of—
C. SCHERF,
J. P. WILLIAMS.